United States Patent [19]

Galand

[11] Patent Number: 5,353,345
[45] Date of Patent: Oct. 4, 1994

[54] METHOD AND APPARATUS FOR DTMF DETECTION

[75] Inventor: Claude Galand, Cagnes sur Mer, France

[73] Assignee: International Business Machines Corporation, Armonk, N.Y.

[21] Appl. No.: 960,744

[22] Filed: Oct. 14, 1992

[30] Foreign Application Priority Data

Dec. 20, 1991 [EP] European Pat. Off. ......... 91480189.9

[51] Int. Cl.⁵ .............................................. H04M 3/00
[52] U.S. Cl. ..................................... 379/386; 379/283
[58] Field of Search ....................... 379/386, 282, 283; 340/825.48

[56] References Cited

U.S. PATENT DOCUMENTS

| | | | |
|---|---|---|---|
| 4,091,243 | 5/1978 | Mizrahi | 379/283 X |
| 4,534,043 | 8/1985 | Krishnan | 340/825.48 X |
| 4,689,760 | 8/1987 | Lee et al. | 379/386 X |
| 4,782,523 | 11/1988 | Galand et al. | 379/386 |

Primary Examiner—James L. Dwyer
Assistant Examiner—Creighton Smith
Attorney, Agent, or Firm—John J. Timar

[57] ABSTRACT

A DTMF tone is detected through the tracking of two tunable filters HAVING coefficients within so-called tunnels each limited by thresholds derived from the tone frequency components to be detected. In and outband energies $E1(n)$ and $E2(n)$ are used to further validate tone detection.

8 Claims, 9 Drawing Sheets

METHOD AND APPARATUS FOR DTMF DETECTION

FIELD OF THE INVENTION

This invention deals with tone detection whereby predefined tone signals are to be detected within received data. The invention more particularly applies to detecting so-called DTMF signalling tones as defined by the CCITT.

BACKGROUND OF INVENTION

Several applications require detection of one or several predefined tone(s) within received data. Such is the case, for instance, in telephone applications wherein signalling tones have to be detected embedded within voice signals or noise.

Correct detection and identification of the received tone is important in order to avoid false action being taken which would result in network mis-function.

The invention will be described more particularly as applied to so-called Multi-Frequency Receivers (MFR) wherein signalling tones combining two CCITT defined single frequency waveforms should be detected in a Touch Tone telephone network.

For instance, current telephone dialing systems are internationally defined by the CCITT, thus enabling common dialing throughout the world. Accordingly, depressing any telephone set dialing key generates a transmission over the telephone line, down to the PBX or CS, of a tone combining two single frequency waveforms. Each said waveform is taken within a predefined group of pure frequencies.

Conventional MFRs made to detect DTMFs (Dual Tone Multi Frequencies) in a digital environment are made of two filter banks, each bank covering a predefined bandwidth, by including one filter pre-tuned for each one of the CCITT defined frequencies. The received tones are detected by monitoring said pre-tuned filters for maximum energy and identifying the waveforms based on the corresponding filters.

Unfortunately, so-called transmission line "twisting" factors may alter differently the signals in the two bank's bandwidths, therefore impairing the tone detection quality.

BRIEF SUMMARY OF THE INVENTION

The present invention enables avoidance of the twisting factor consequences in tone detection through use of tunable filter banks directly monitored on frequency rather than energy.

The invention will now be described based on a preferred embodiment made with reference to the attached drawings.

DETAILED DESCRIPTION OF PREFERRED EMBODIMENT

Let's first recall that Dual Tone Multi-Frequency (DTMF) is a telephone signalling standard based on the combination of two sinusoïdal signals, each signal being taken within a group of four, and generated according to characteristics of level, duration, noise and distortion, specified by the CCITT (see Recommendations Q.23/Q25 Fasc. VII. 1, Yellow Book, Geneva, 1981). The two groups of frequencies are, in Hertz:

| Group 1 | Group 2 |
| --- | --- |
| 697 | 1209 |
| 770 | 1336 |
| 852 | 1477 |
| 941 | 1633 |

In other words, each CCITT tone includes two predefined, single frequency waveform components, each being taken within one of the above two predefined groups.

The stringent characteristics of the signals, in terms of bandwidth, dynamic range, noise, twist factor, and duration, as well as the specified low error rate accepted, translate into the complexity and cost of MFRs.

Figure 1:
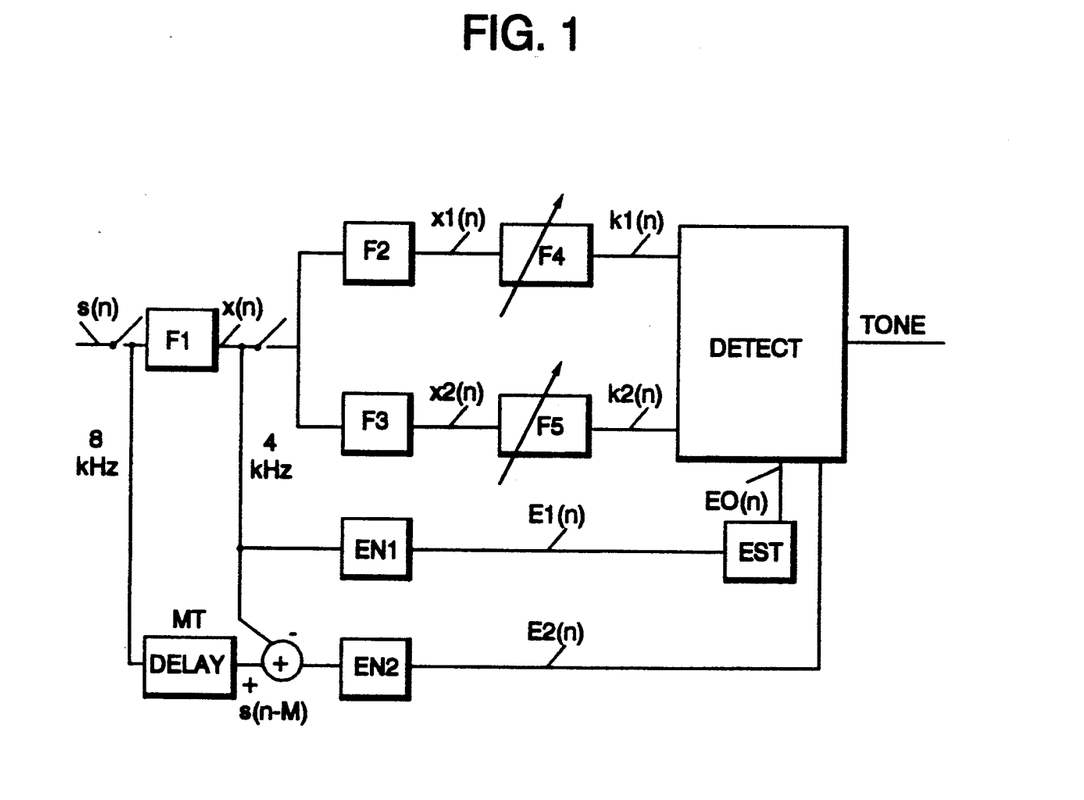
FIG. 1 is a block diagram of a preferred embodiment of an MFR of this invention.

Represented in FIG. 1 is a block diagram architecture of the MFR of this invention. The input signal s(n) is band-limited to 4 Khz and sampled at 8 Khz. It may contain either speech, or noise, or a DTMF signal or a combination of these.

Figure 2:
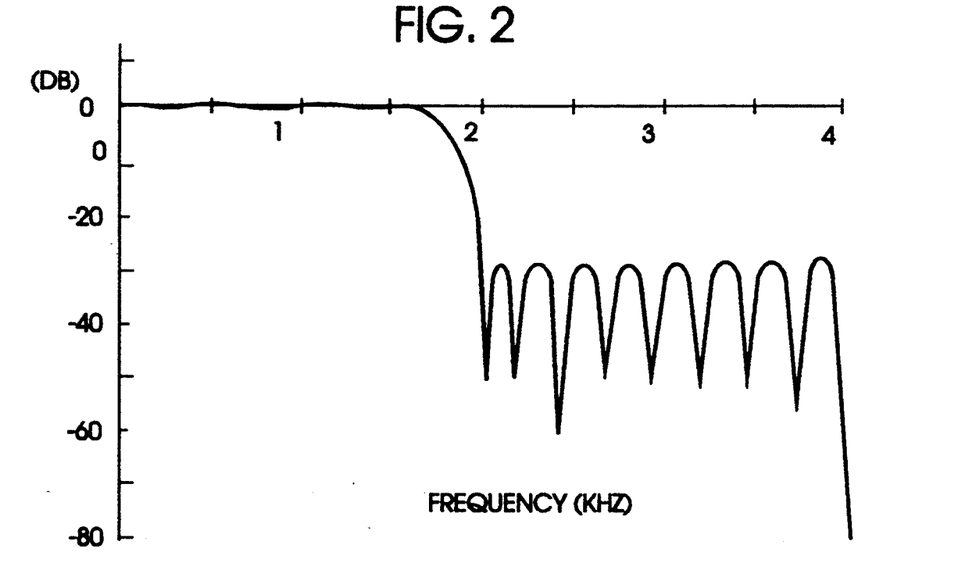
FIGS. 2 and 3 illustrate the harmonic responses of filter F1, F(2) and F(3) of FIG. 1.

The signal s(n) is first low-pass filtered to the 0–2 Khz frequency bandwidth by filter F1. The resulting signal x(n) is sub-sampled at 4 Khz, for instance by dropping one out of two samples. The filter F1 is made in accordance with conventional digital filter techniques to provide a 31 tap, half-band filter with 0.3 dB in-band ripple and 30 dB out-of-band rejection (see the harmonic response of FIG. 2).

Figure 3:
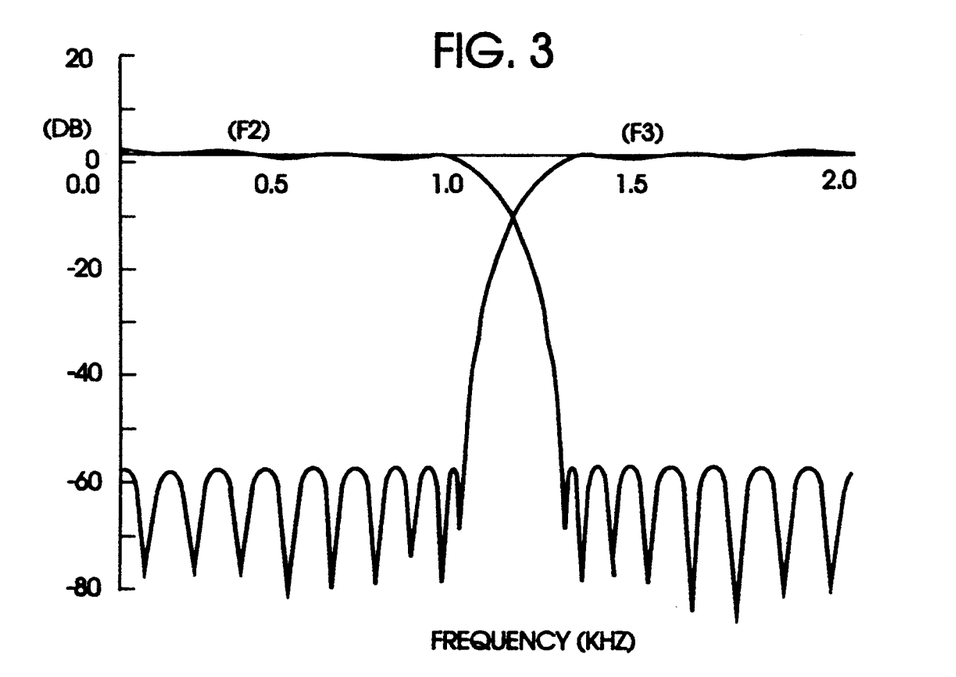

The x(n) signal is then split into two bands by filters F2 and F3. These filters are designed to each cover one of the two CCITT groups of frequencies, respectively, and therefore may be made using conventional 31 tap digital filters with 0.5 dB in-band ripple and 60 dB out-of-band ripple (see harmonic responses of FIG. 3).

Filters F2 and F3 provide signals x1(n) and x2(n) respectively, which are then respectively fed into tunable adaptive filters F4 and F5 provided with means for continuously estimating and adapting their coefficients k1(n) and k2(n), respectively, in each of the DTMF sub-bands, while tuning said adaptive filters. The tunings of adaptive filters F4 and F5 are achieved in the coefficient ADAPT device 50 as explained below (see FIG. 4). Also, the 4 Khz sequences k1(n) and k2(n) are processed by a detection device (DETECT) that eventually identifies the tone. Also fed into DETECT are the input signal (in-band) energy E1(n) and the out-of-band energy E2(n), respectively computed in devices EN1 and EN2 and used to further validate the detection of a CCITT defined tone. An estimate E0(n) of the idle noise is also computed from E1(n).

Figure 4:
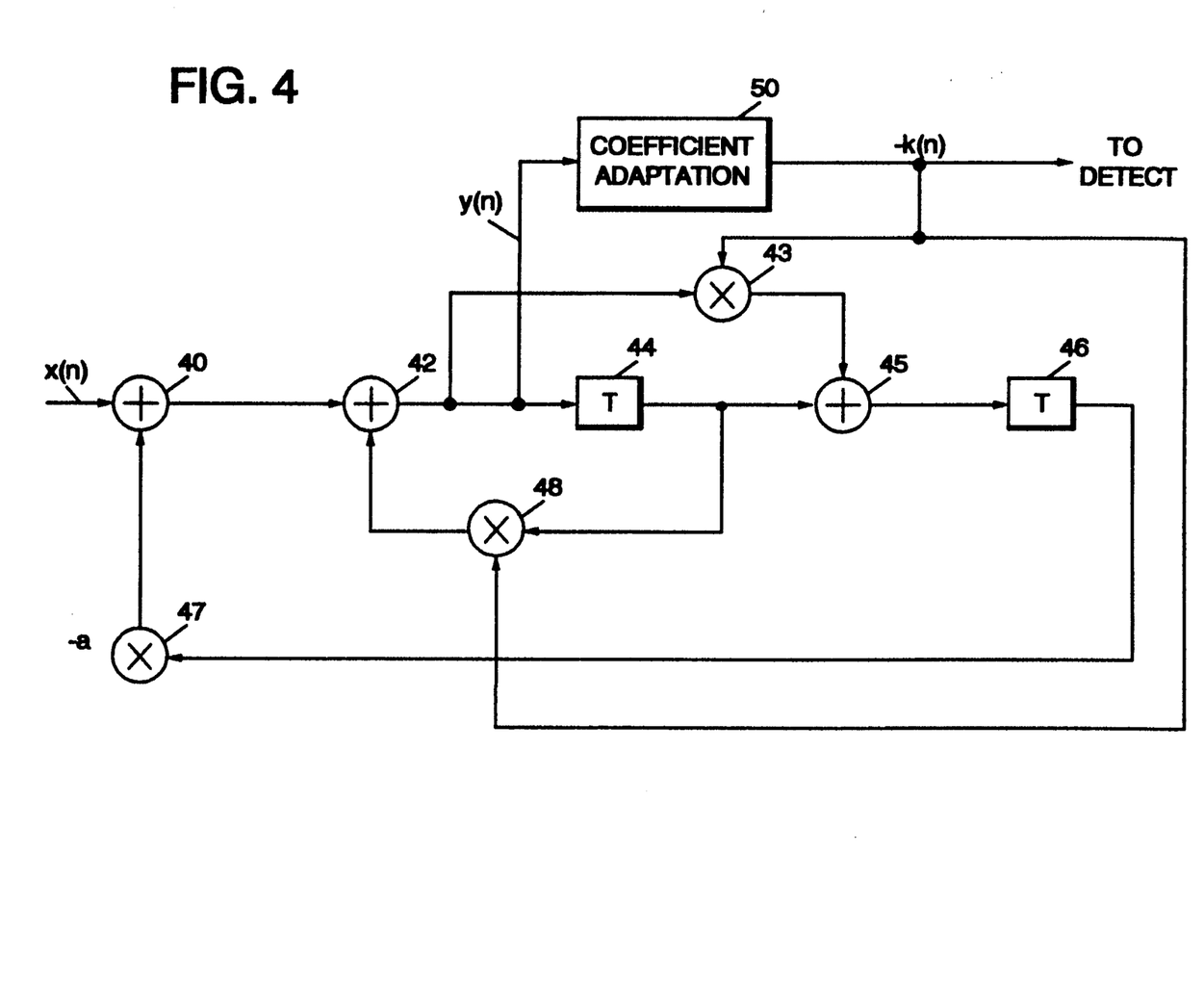
FIG. 4 is a representation of the detailed structure of Filters F4 and F5 of FIG. 1.

The tunable adaptive filters F4 and F5 are made according to FIG. 4.

They are both similar in their architecture and therefore only one of these shall be described (e.g. F4).

The input sample $x_1(n)$ is fed into a first adder 40 the output of which is fed into a second adder 42. The output of 42 is fed into both, a first multiplier 43 and a first delay cell 44, delaying by one sampling interval T=1/4000. The output of delay cell 44 is fed into a third adder 45, the output of which is in turn fed into a second delay cell 46. The output of delay cell 46 is fed back into first adder 40 through a second multiplier 47, multiplying by a predefined constant coefficient (e.g. a=0.9). The output of delay cell 44 is fed back into adder 42 through a third multiplier 48. Both multipliers 43 and 48 multiply (at nth sampling interval n) by a tuning filter coefficient $-k_1(n)$, with said coefficient being computed in coefficient ADAPT device 50 during the filter tuning process. When the input signal $x_1(n)$ consists essentially of a pure sinewave with frequency $\omega=2\pi/T$, the adaptation process converges to the value $k_1 = \cos \omega$. In other words, $k_1(n)$ is directly related to the signal frequency.

Assuming y(n) be the filter output signal, then the F4 (or F5) transfer functions are (in the Z domain):

$$H(Z) = \frac{1}{1 + k(1 + a)Z^{-1} + aZ^{-2}}$$

During the tuning process the k(n) coefficient is tracked and adapted by a method derived from the Burg algorithm as described in the article published by Nam Ik Cho et al in the IEEE Transactions on ASSP, Vol. ASSP-37, No. 4, August 1989, pp. 585–589.

At each sampling interval, one computes the following A(n) and B(n) terms:
$A(n) = 2y(n)$ $B(n) = y(n) + y(n-2)$ These terms are then intergrated into:

$C(n) = \lambda C(n-1) + A(n).B(n)$ $D(n) = \lambda D(n-1) + A^2(n)$ wherein $\lambda$ is a predefined constant factor, e.g. $\lambda = 0.9$.

An estimated value $\tilde{k}(n)$ of the filter coefficient k(n) is computed through:

$$\tilde{k}(n) = \frac{c(n)}{D(n)}$$

with $\tilde{k}$ being clipped to:
$\tilde{k}(n)) = -1$ if computed $\tilde{k}(n) < -1$ $\tilde{k}(n) = 1$ if computed $\tilde{k}(n) < 1$ Finally, k(n) is computed through:

$$k(n) = \frac{\tilde{k}(n) + k(n-1)}{2}$$

The filtering relation is:

$y(n) = x_1(n) - k(n)(1+a)y(n-1) - ay(n-2)$ wherein "a" is a constant (e.g. a=0.9)

As already mentioned, the above equations apply to both F4 and F5 and therefore to both $k_1(n)$ and $k_2(n)$. It should be noted that $k(n) = \cos \omega = \cos 2\pi f$. The measurement of k gives a direct measurement of the frequency (f) of the received signal to which the filters F4 and F5 adapt. This is achieved through the F4 and F5 filter coefficients k(n) (wherein k(n) would be either $k_1(n)$ or $k_2(n)$) adapting to values directly related to the filter input signal frequency, k(n) could therefore be considered as a frequency dependent parameter. In case the filter F4 or F5 tunes to a tone frequency component, k(n) is then a tone frequency component dependent parameter.

The detection operations performed in the DETECT device of FIG. 1 are based on the recording of the trajectories of the two coefficients $k_1(n)$ and $k_2(n)$ for a long enough period of time (e.g. 60 sampling intervals), within two so-called "tunnels", each of these tunnels being specified in one CCITT group of frequencies defining the tones.

The tunnels are defined for each frequency to be searched by two thresholds which could be set to be directly related to the tone component frequencies (i.e. each k(n) for each tone frequency component shall be within one of said tunnels).

For each of the i=1, 2, ..., 8 CCITT standard frequencies f(i), one may define lower threshold TL(i) and upper threshold TU(i) as shown hereunder:

|  | f(i) | TL(i) | $k(n) = \cos 2\pi f(i)$ | TU(i) |
|---|---|---|---|---|
|  | f(1) = 697 | 0.44 | 0.4580 | 0.47 |
|  | f(2) = 770 | 0.34 | 0.3535 | 0.37 |
| (F2) | f(3) = 852 | 0.21 | 0.2304 | 0.25 |
|  | f(4) = 941 | 0.07 | 0.0920 | 0.11 |
|  | f(5) = 1209 | −0.35 | −0.3224 | −0.29 |
|  | f(6) = 1336 | −0.53 | −0.5036 | −0.47 |
| (F3) | f(7) = 1447 | −0.71 | −0.6811 | −0.65 |
|  | f(8) = 1633 | −0.86 | −0.8384 | −0.81 |

The setting of these thresholds are based on statistical results obtained upon analysis of noisy and noiseless signals, and of signals comprising frequency components that are not at the nominal frequency. The thresholds are therefore derived from each tone frequency component.

Figure 5:
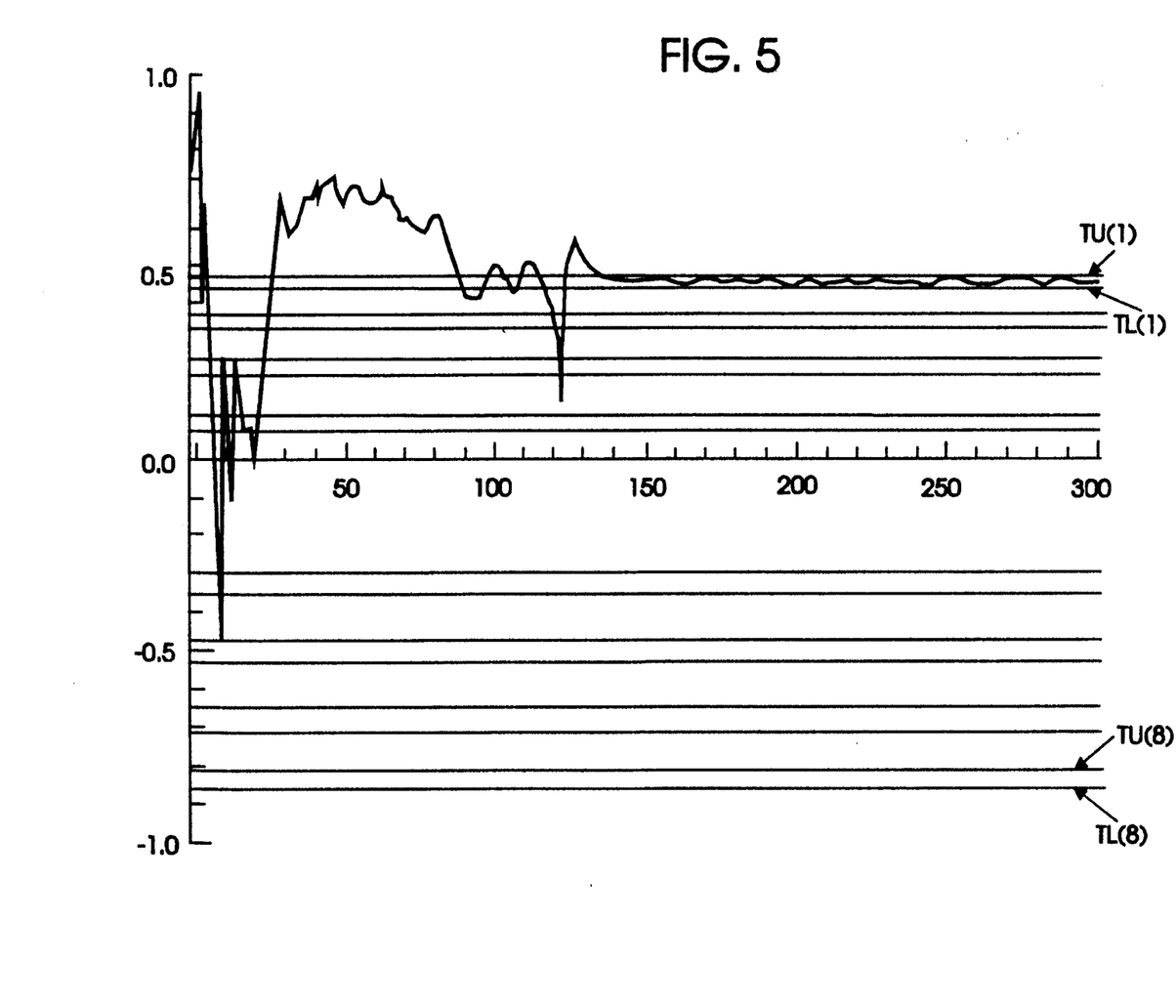
FIG. 5 illustrates so-called "tunnels" to be used for tracking tone frequency components (pure sinewaves).

FIG. 5 is made to illustrate the convergence of k(n) to $\cos 2\pi$ f(i) wherein f(i) is within one of the eight tunnels, each made to include one of the frequency components.

During operation, the measured k should only be considered valid if it persists for a first predefined time interval, say To=60 T (T being the sampling intervals=1/4000), without being interrupted for more than a second time interval, say T1=5T.

Figure 6:
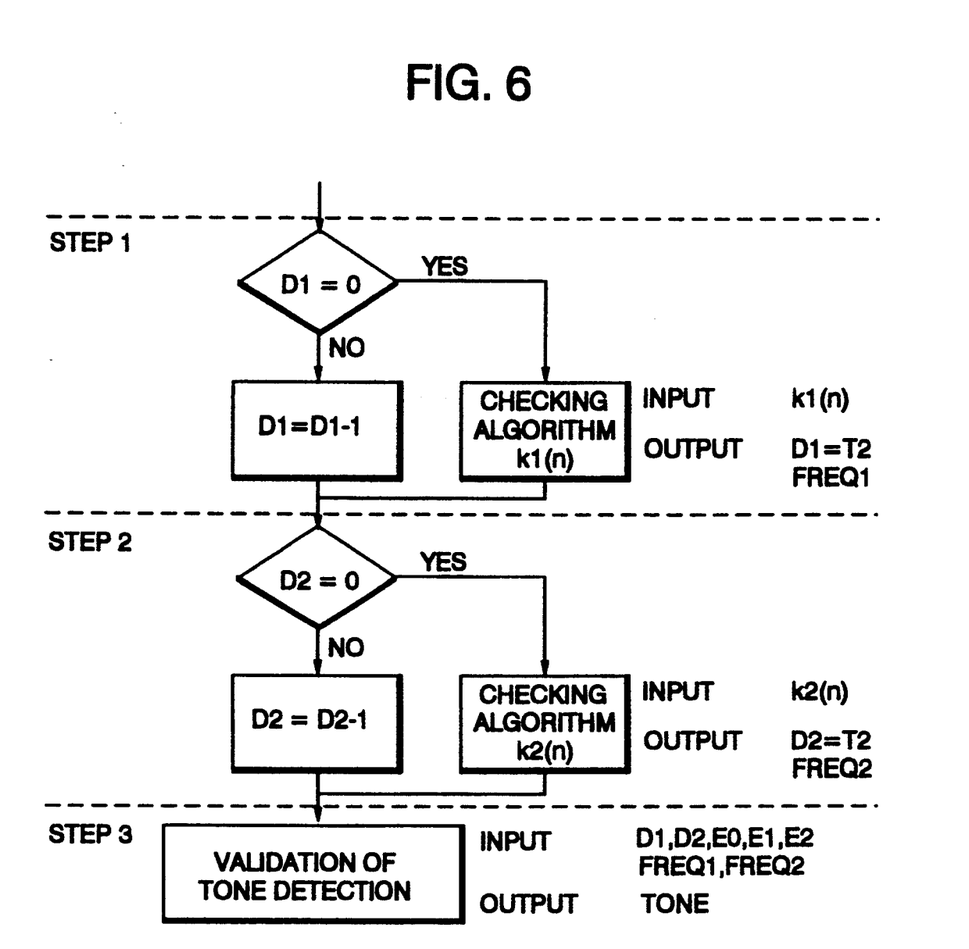
FIG. 6 is a flow-chart illustrating the detection process.

Therefore, the DETECT validations are preformed according to the flowchart of FIG. 6, showing the general block diagram of the detection logic. STEPS 1 and 2 are meant to track the two frequencies constituting the tone, through the trackings of $k_1(n)$ and $k_2(n)$. These steps may obviously be performed sequentially, as shown, or in parallel. STEP 3 is meant to validate the tone detection.

In STEP 1, the new sample $k_1(n)$ available at each 4 KHz sampling interval, is checked versus the upper and lower value of each of the thresholds defining the tunnels in Group 1. The checking algorithm may result in a detection flag D1 being set initially to a constant value T2 and in a frequency counter FREQ 1 being set to the proper frequency index. The checking algorithm is performed only if no detection was pending (D1=0). If a detection is pending, then D1 is decremented by one. This allows latching the detection of the first frequency for a predetermined time T2 and therefore detection of DTMF tone made of two non synchronous frequencies.

In STEP 2, the above operations are performed over group 2, using the k2(n) sequence to track FREQ 2. Again, the checking algorithm is performed only if no detection is pending (D2=0).

STEP 3 is meant to enable further validation of tone detection (through flags D1 and D2), by an analysis of the current energy components E1(n) and E2(n) versus pre specified thresholds. The energies are computed to be:

$$E1(n) = \sum_{i=0}^{p} x^2(n-i)$$

wherein p represents a measurement window, e.g. p=16 corresponding to 2 ms.

$$E2(n) = \sum_{i=0}^{p} (s(n-i-M) - x(n-1))^2$$

where M represents the delay due to filter F1 (M=15 in our implementation).

E2(n) is therefore the energy of the signal in the frequency band 2–4 KHz, estimated at each sampling interval.

At each sampling interval, an estimate of the idle noise energy E0(n) is computed. For example, one may use the following estimation:

$$E0(n) = Min\ (E1(n), E0(n))$$

where E0(n) is initialized to the maximum expected idle noise energy.

Also, the input signal is a corrupted version of the generated tone signal, after addition of an idle noise in the transmission path from the original source to the Multi-Frequency Receiver. Therefore, the estimation of a ratio R can be useful for the detection process. If r denotes the out-of-band attenuation of the low-pass filter F1, the ratio R can be expressed as:

$$R = \frac{E1(n) - E0(n)}{E2(n)/r - E0(n)}$$

Figure 9:
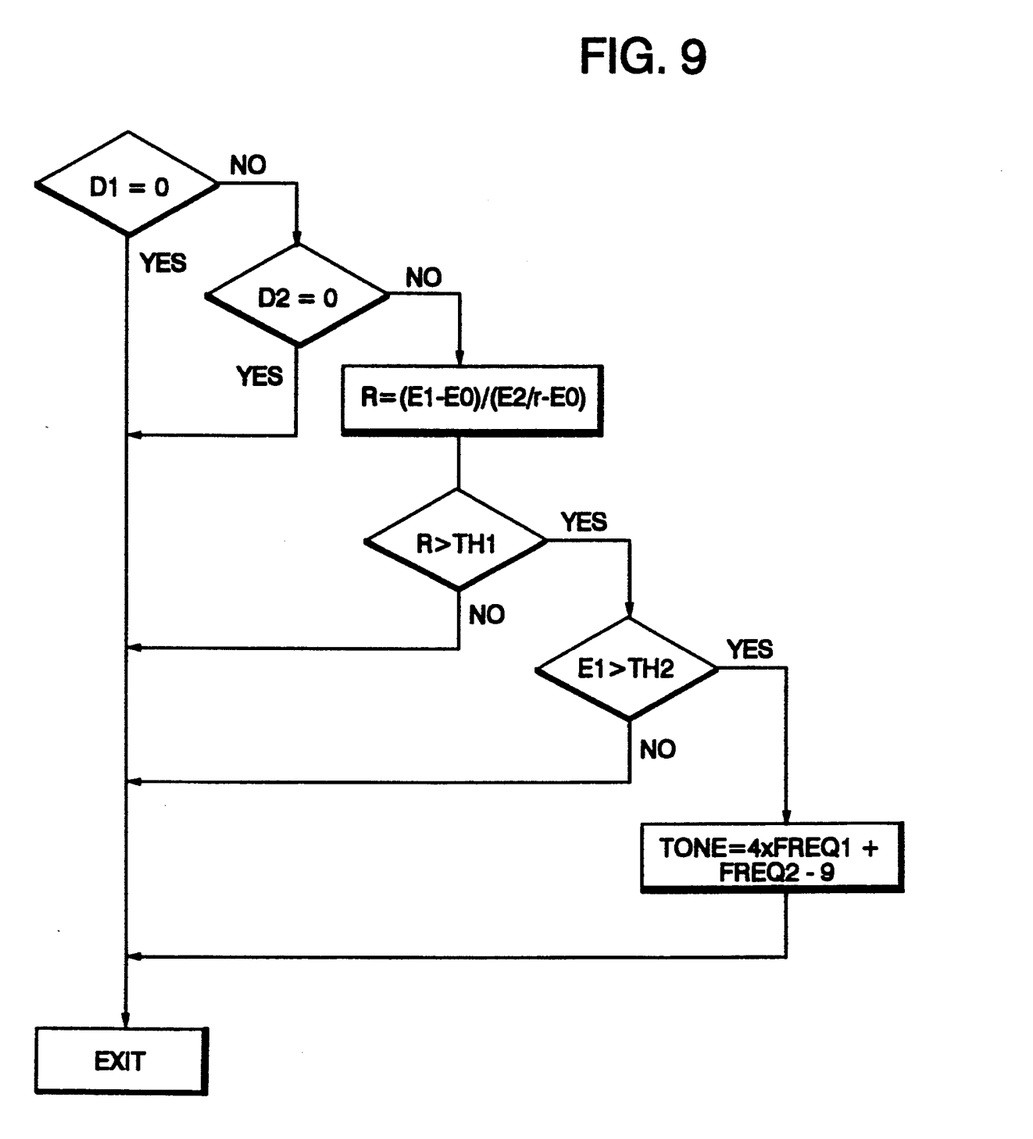
FIG. 9 is a detailed flow chart of STEP 3 of the process of FIG. 6.
Figure 10:
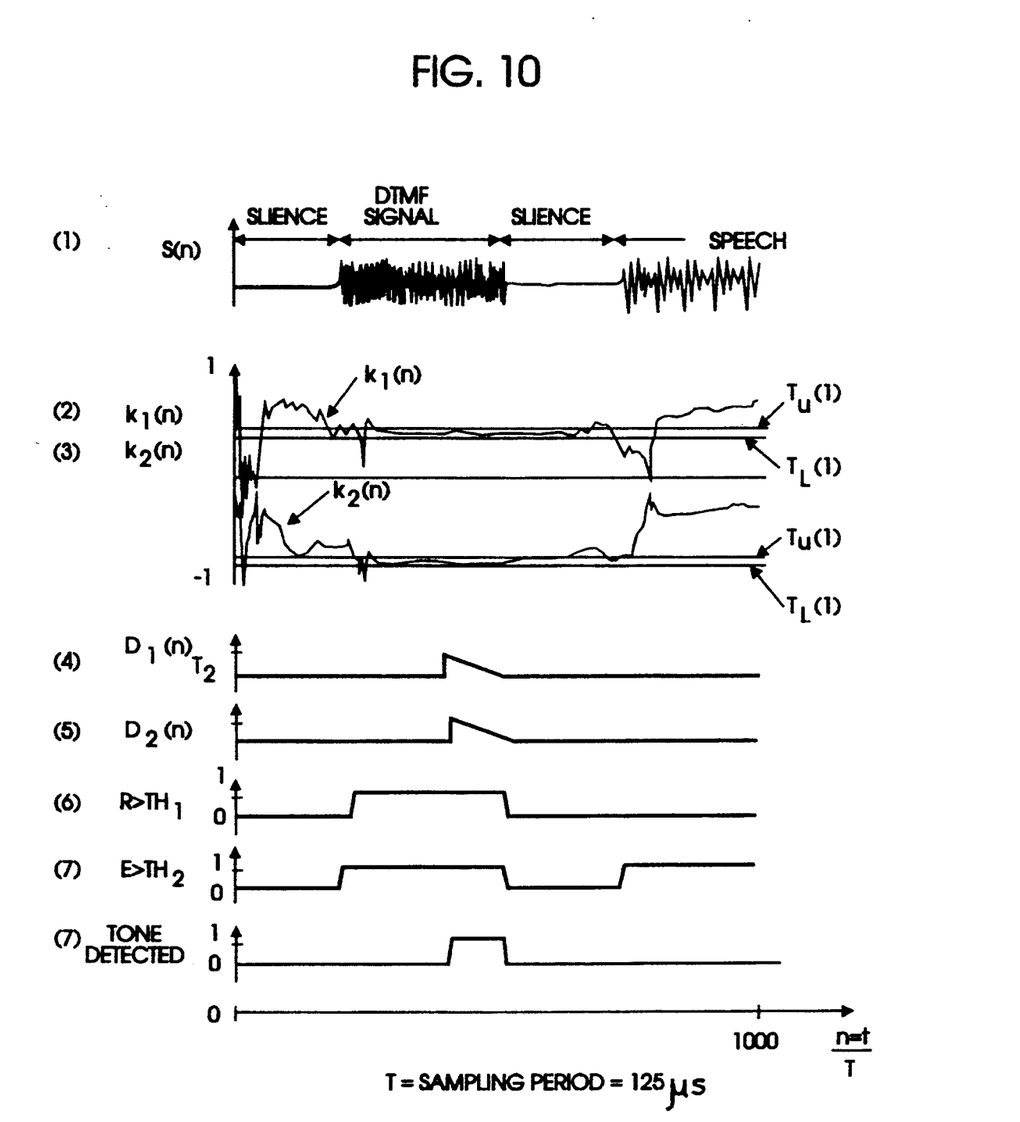
FIG. 10 is an example illustrating the detection process.

The above defined operations preformed during STEP 1 through STEP 3 are detailed below in the flowcharts of FIGS. 7–9, and further illustrated in FIG. 10 showing an example.

Figure 7:
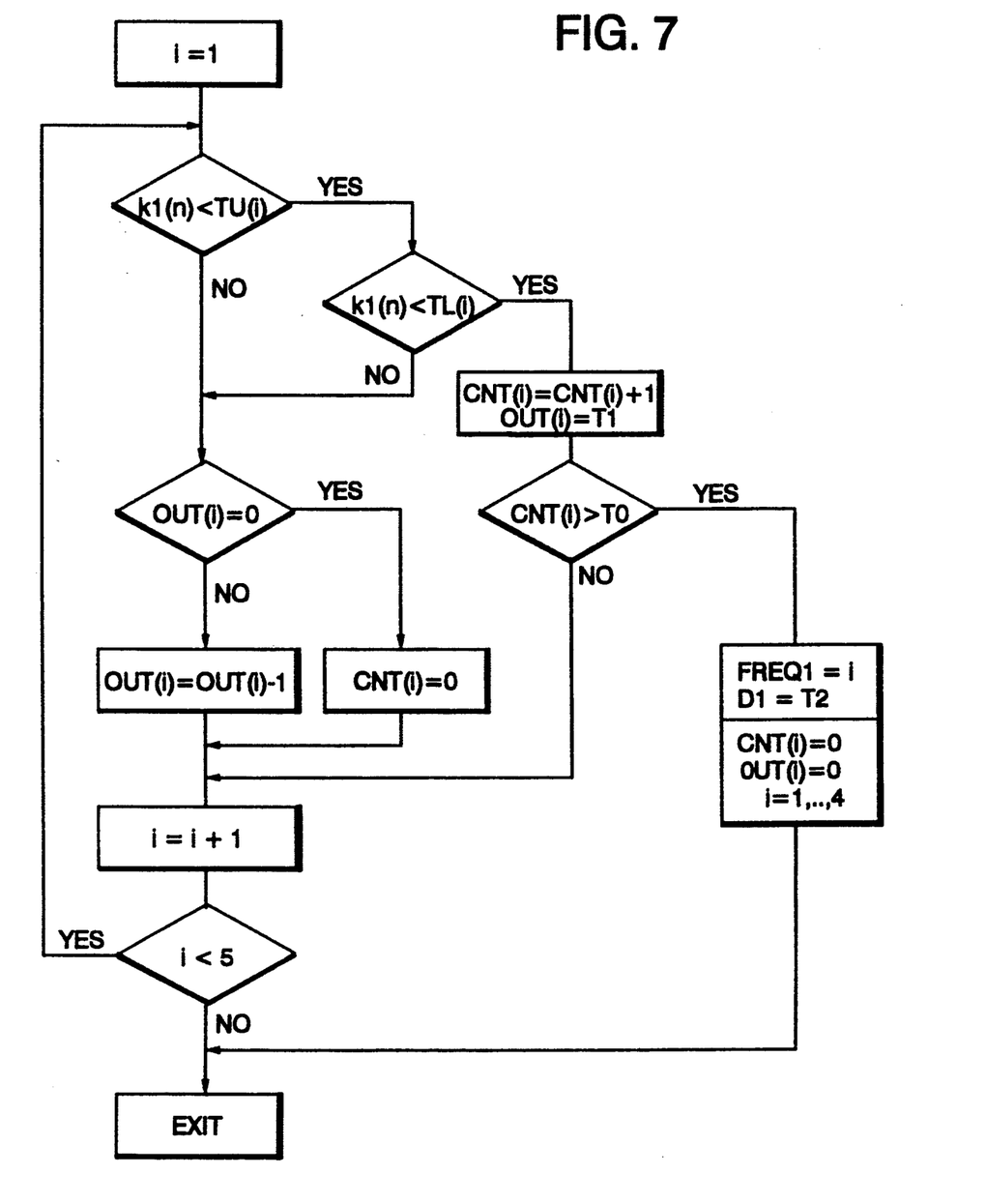
FIGS. 7 and 8 are detailed flow-charts of STEP1 and STEP2 of the process of FIG. 6.
Figure 8:
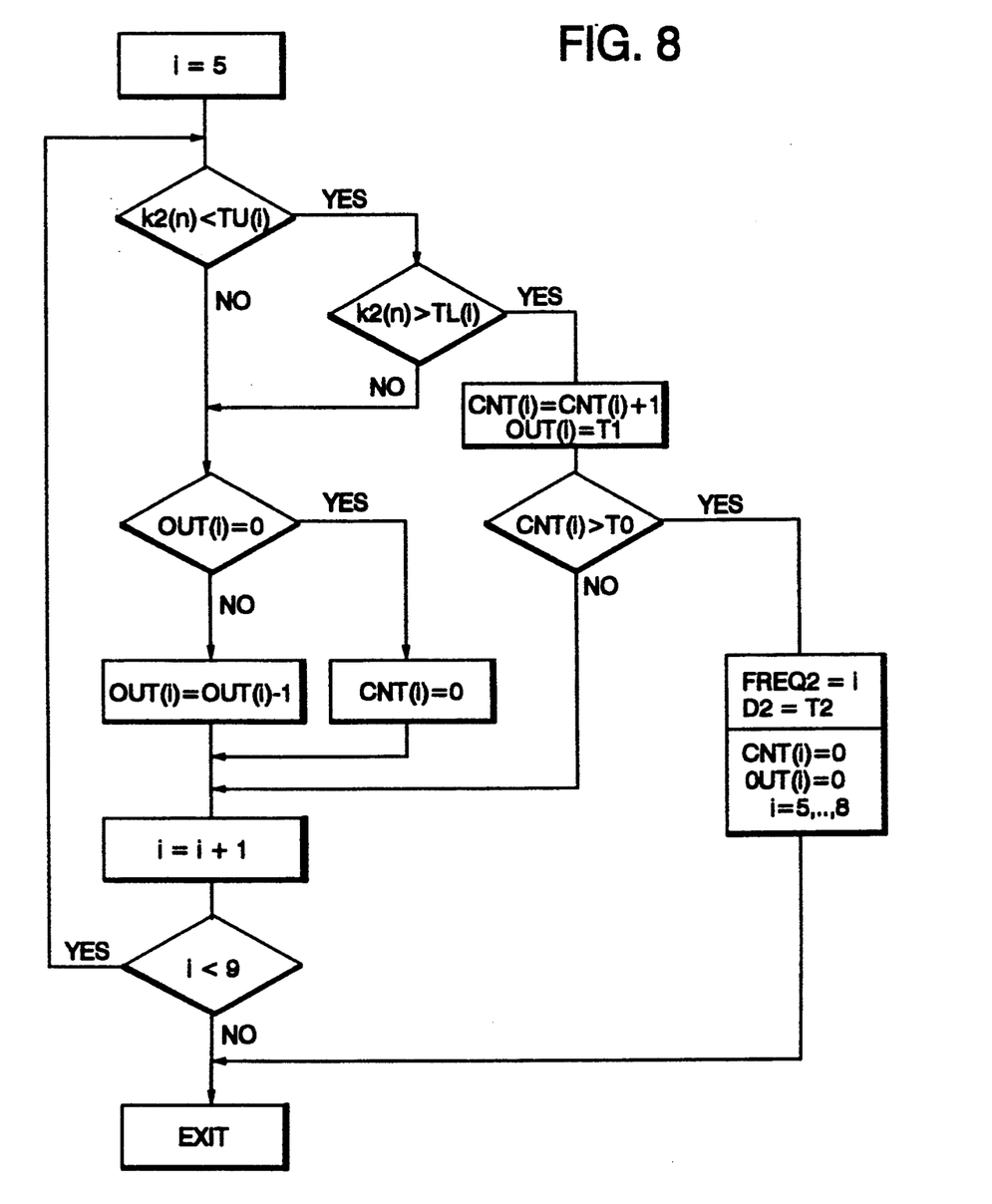

FIGS. 7 and 8 respectively represent the checking algorithms that are performed on k1(n) and k2(n) at each 4 KHz sampling interval. As already mentioned, both algorithms are similar, but use different constants. One may therefore limit the detailed description to one group of frequencies only. For instance, let's describe the operation of the algorithm on k1(n), which makes use of two counters CNT(i) and OUT(i) for each of the four frequencies in group 1 (i=1, 2, 3, 4).

The coefficient k1(n) is successively checked versus the upper (TU(i)) and lower (TL(i)) thresholds of each tunnel of group 1.

If it appears that the coefficient k1(n) is in tunnel (i) (i.e. between TU(i) and TL(i)), then a counter CNT(i) is incremented and a time-out OUT(i) is initialized to T1. Then, the content of counter CNT(i) is tested versus a constant To. If it is greater than this constant, then, the tone corresponding to this tunnel is detected, that is a counter FREQ 1 is set to index i. The counters CNT(i) and OUT(i) are reset and the group flag D1 is set to a constant T2.

the time-out OUT(i) is tested and decremented. If it has reached a zero value, then the counter CNT(i) is eventually reset. The time-out allows a coefficient trajectory to go out of a tunnel for a few samples, for instance in case of low signal-to-noise ratio.

As already mentioned, the operations on k2(n) are similar to those operated over k1(n) (see FIG. 8 versus FIG. 7) and use two counters CNT(i) and OUT(i) for each of the frequencies in group 2 (i=5, 6, 7, 8).

Therefore, during STEP 1 and STEP 2, one tracks for the stability of the coefficients k1(n) and k2(n) each within one of said tunnels.

FIG. 9 is a flow-chart illustrating the validation algorithm which is performed at each 4 KHz sampling interval, after k1(n) and k2(n) have been checked versus the tunnels. A DTMF tone is finally detected if and only if:

the detection flag D1 is on (i.e. logic condition=1), showing that a stable frequency has been detected in group 1;

the detection flag D2 is on, showing that a stable frequency has been detected in group 2;

the ratio R of the in-band to out-band energy of the noiseless signal s(n) is greater than a pre-specified threshold TH1 to avoid possible false detection in the presence of speech; and, the signal energy E1 is greater than a pre-specified threshold TH2.

In a preferred embodiment, the thresholds have been respectively set to: To=60; T1=5; T2=60; TH1=1,000. As per TH2, it should depend on the scaling of the implementation, but must reflect the minimum energy level of a tone in reception, as specified by the CCITT in the already cited reference.

FIG. 10 is made to illustrate the detection process with an example.

The first diagram (upper one referenced (1)) shows an analog form of signal s(n) versus time t=nT. It includes first a 25 ms long silence including some noise then a 40 ms long DTMF tone, followed by 28 ms of silence plus noise, and finally some speech (32 ms).

The corresponding k1(n) trace (see 2nd upper diagram (2)) naturally enters one of the so-called group 1 tunnels (e.g. tunnel for i=1) during the DTMF tone occurrence (with a slight lag time).

k2(n) trace also enters a tunnel (e.g. tunnel 7) with a lag time (see third diagram (3)).

The signal to noise ratio is 20 dB. The tone number is two, corresponding to frequency index i=1 in group 1 and index i=7 in group 2.

As mentioned, upon detecting FREQ 1 or FREQ 2, flags D1 or D2 are set to T2 and decremented as long as DTMF tone components are detected (see curves (4) and (5)).

Next curves illustrate the logic conditions set to 1 for R>TH1 and E1>TH2, respectively (see curves (6) and (7)).

Finally, an AND logic condition over conditions (4), (5), (6) and (7) indicates a DTMF tone being detected (see (8)).

What is claimed is:

1. A method for detecting a Dual Tone Multi Frequency (DTMF) signal in a received sampled input signal x(n) derived from a band-limited signal s(n), said tone including two predefined single frequency components being taken respectively within one out of two groups of predefined frequencies, said method including:

setting a so-called tunnel for each one of said group frequencies, each tunnel being limited by an upper and a lower threshold derived from said one of said group frequencies;

feeding the input signal x(n) into a first filtering means splitting x(n) frequency bandwidth into two bands each including one of said predefined groups of frequencies and deriving therefrom signals x1(n) and x2(n) respectively;

feeding each said x1(n) and x2(n) into an adaptive digital filter each including one varying coefficient k1(n) and k2(n) respectively;

tuning each of said adaptive filters and tracking said filter coefficients k1(n) and k2(n), said tracking including comparing each of said filter coefficients k1(n) and k2(n) with said upper and lower thresholds corresponding to one of said set tunnels to determine if said filter coefficients k1(n) and k2(n) each remain within one of said set tunnels for a minimum predefined time length;

whereby a tone is being detected and identified.

2. A method for detecting a DTMF tone signal according to claim 1, wherein said upper and lower thresholds are derived from $\cos 2\pi f(i)$, with $f(i)$ being the frequency of one of said predefined frequencies.

3. A method for detecting a DTMF tone signal according to claim 2, wherein said tracking is performed for a predefined number of signal x(n) sampling intervals.

4. A method for detecting a DTMF tone signal according to claim 3, wherein said tracking for a predefined number of sampling intervals is terminated if either of said filter coefficients k1(n) and k2(n) is outside said corresponding one of said set tunnels for a predefined timeout period.

5. A method for detecting a DTMF tone signal according anyone of to claims 1 through 4, wherein filter coefficient tracking operations for both groups of frequencies are performed sequentially.

6. A method for detecting a DTMF tone signal according anyone of to claims 1 through 4, wherein the filter coefficient tracking operations for both groups of frequencies are performed in parallel.

7. A method for detecting a DTMF tone signal according to anyone of claim 1 through 4, further including a validation step involving determining an in-band (E1) energy and an out-of-band (E2) energy associated with said, band-limited input signal after performing a low-pass filtering operation and checking said in-band and out-of-band energies versus a pair of pre-defined thresholds.

8. A method for detecting a DTMF tone signal according to claim 7, wherein said energy validation checking step includes testing that a ratio R of the in-band energy to the out-of-band energy of the band-limited input signal, after reducing each of said in-band and out-of-band energies by an idle noise energy, is greater than a pre-specified threshold TH1 and that the input signal energy E1 is greater than a pre-specified threshold TH2.

* * * * *